(12) United States Patent
Popescu et al.

(10) Patent No.: US 8,984,091 B1
(45) Date of Patent: Mar. 17, 2015

(54) PROVIDING CONTENT BASED ON TIMESTAMP OF LAST REQUEST FOR CONTENT

(75) Inventors: Daniel Michael Popescu, Santa Monica, CA (US); Troy Walker, Santa Monica, CA (US); James Beser, Burlingame, CA (US); Emilia Stefania Pana, Santa Monica, CA (US); Aaron Nathaniel Rothman, Sunnyvale, CA (US); Mehdi Sharifzadeh, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/566,917

(22) Filed: Aug. 3, 2012

(51) Int. Cl.
*G06F 15/16* (2006.01)

(52) U.S. Cl.
USPC ......... 709/217; 709/228; 709/205; 705/14.53

(58) Field of Classification Search
CPC .................................................... H04L 43/106
USPC .......................................................... 709/217
See application file for complete search history.

(56) References Cited

U.S. PATENT DOCUMENTS

| | | | |
|---|---|---|---|
| 5,948,061 A | 9/1999 | Merriman et al. | |
| 7,155,508 B2 | 12/2006 | Sankuratripati et al. | |
| 8,055,655 B1 * | 11/2011 | He et al. | 707/727 |
| 8,671,021 B2 * | 3/2014 | Maharajh et al. | 705/14.66 |
| 2005/0187823 A1 | 8/2005 | Howes | |
| 2006/0293957 A1 | 12/2006 | Petersen et al. | |
| 2008/0052195 A1 * | 2/2008 | Roth et al. | 705/27 |
| 2008/0221987 A1 * | 9/2008 | Sundaresan et al. | 705/14 |
| 2010/0094878 A1 * | 4/2010 | Soroca et al. | 707/748 |
| 2010/0205035 A1 * | 8/2010 | Baszucki et al. | 705/10 |
| 2011/0125832 A1 * | 5/2011 | Dahl | 709/203 |
| 2011/0209133 A1 * | 8/2011 | Mahajan et al. | 717/170 |
| 2011/0307326 A1 * | 12/2011 | Hsiao et al. | 705/14.42 |
| 2013/0009873 A1 * | 1/2013 | Huang et al. | 345/163 |

OTHER PUBLICATIONS

"YouTube First Watch:First Come, First Served", 2012, 2 pages, http://static.googleusercontent.com/external_content/untrusted_dlcp/www.youtube.com/en/us/yt/advertise/medias/pdfs/first-watch-onesheeter-en.pdf.
Research brief "The Link Between Ad Placement and Performance", 6 pages, Casale Media, http://casalemedia.com/files/Casale-Ad-Visibility-Report-FINAL.pdf.
URL:http://searchengineland.com/youtube-first-watch-program-creates-massive-reach-for-video-ads-78373.
URL:http://www.youtube.com/yt/advertise/first-watch.html.

\* cited by examiner

*Primary Examiner* — Kevin Bates
*Assistant Examiner* — Mark A Scott
(74) *Attorney, Agent, or Firm* — John D. Lanza; Foley & Lardner LLP

(57) ABSTRACT

Systems and methods of providing information via a computer network are provided. A request for content to display with a resource can be received via a computer network at a data processing system. The request can include user information and resource information. The data processing system can retrieve a timestamp of a last request for content from a user associated with the user information. The data processing system can determine if a difference between current time and the timestamp reaches a threshold, and can retrieve a plurality of content items based at least in part on whether the threshold is reached and at least one attribute of the content items. The data processing system can select at least one content item and provide it for display with the resource. The data processing system can store the current time as the timestamp of the last request for content from the user.

20 Claims, 4 Drawing Sheets

PROVIDING CONTENT BASED ON TIMESTAMP OF LAST REQUEST FOR CONTENT

BACKGROUND

In a networked environment such as the Internet or other networks, entities such as people or companies can provide information for public display on resources, for example web pages, documents, applications, or other resources. The Internet content can include text, video, or audio information provided by the entities via, for example, a web page server for display on the Internet. Additional content can also be provided by third parties for display on the resources together with the information provided by the entities. Thus, a person viewing a resource can access the information that is the subject of the resource, as well as third party content that may or may not be related to the subject matter of the resource.

SUMMARY

At least one aspect is directed to a computer-implemented method of providing information via a computer network. The method receives, by a data processing system, a request for content to display with a resource. The request includes user information and resource information. The method retrieves, from a user repository, a timestamp of a last request for content from a user associated with the user information. The method determines if a difference between current time and the timestamp reaches a threshold. The method retrieves, from a content repository, a plurality of content items based at least in part on whether the threshold is reached and at least one attribute of the content items. The method selects at least one content item from the plurality of content items and provides the at least one content item for display with the resource. The method stores the current time as the timestamp of the last request for content associated with the user in the user repository.

At least one aspect is directed to a system of providing information via a computer network. The system includes a data processing system having a content placement circuit. The data processing system can receive a request for content to display with a resource. The request can include user information and resource information. The data processing system can retrieve, from a user repository, a timestamp of a last request for content from a user associated with the user information. The data processing system can determine if a difference between current time and the timestamp reaches a threshold. The data processing system can retrieve, from a content repository, a plurality of content items based at least in part on whether the threshold is reached and at least one attribute of the content items. The data processing system can select at least one content item from the plurality of content items, and can provide the at least one content item for display with the resource. The data processing system can store the current time as the timestamp of the last request for content associated with the user in the user repository.

At least one aspect is directed to a computer readable storage medium having machine instructions stored therein. The instructions are executable by one or more processors to cause the one or more processors to perform operations including instructions to receive a request for content to display with a resource. The request can include user information and resource information. The instructions can include instructions to retrieve, from a user repository, a timestamp of a last request for content from a user associated with the user information. The instructions can include instructions to determine if a difference between current time and the timestamp reaches a threshold. The instructions can include instructions to retrieve, from a content repository, a plurality of content items based at least in part on whether the threshold is reached and at least one attribute of the content items. The instructions can include instructions to select at least one content item from the plurality of content items, and to provide the at least one content item for display with the resource. The instructions can include instructions to store the current time as the timestamp of the last request for content associated with the user in the user repository.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
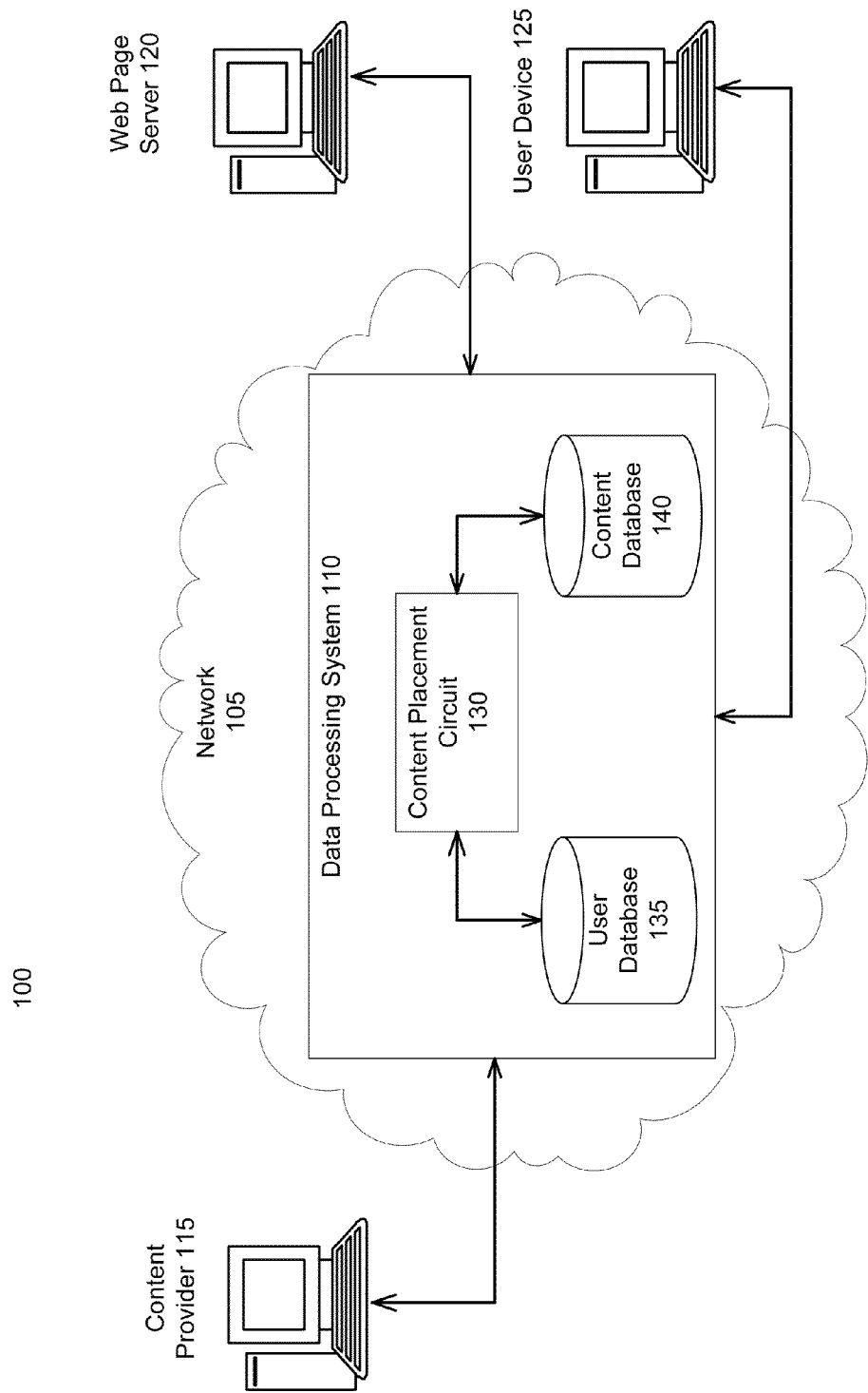
FIG. 1 is a block diagram depicting an example system of providing information via a computer network, according to an illustrative implementation.

Following below are more detailed descriptions of various concepts related to, and embodiments of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a user device) can view a resource such as a web page via the Internet by communicating with a web page server corresponding to that web page. The web page can include content that is the subject of the web page, as well as additional content such as advertisements. In one implementation, responsive to receiving a request to access the web page, the web page server can communicate with a data processing system such as a content placement system to request a content item for insertion into the rendering of the web page displayed at the computing device. The content placement system can select the appropriate content item and provide it to the web page server for display with the web page.

In another implementation, the web page server may provide webpage data to the computing device, which may include one or more advertisement tags. An advertisement tag can be any piece of web page code associated with placing a content item into a content item slot of a web page. In this implementation, the advertisement tags may cause the computing device to make a request for content. The content placement system can identify a content item and provide the content item to the computing device for display with the web page.

During a browsing session, a user is likely to pay more attention to the content on the first web page that the user sees. Thus, content items on the first web page that a user views during a browsing session may have greater monetizable value. The system and method described herein serves certain types of content or predetermined content items to a user only after the user takes a break from browsing. The certain types of content can be determined based on the importance of the content (e.g., news about education or children's well-being) or the monetizable value of content (e.g., a content provider's willingness to pay more to have the content displayed first) or other criteria.

For example, a user browses a web page of a web page server (e.g., a publisher). The web page server can send a request to a data processing system to request content to be displayed with the web page. The data processing system can determine if the requested content is the first content that the user sees after a break (e.g., 30 minutes) from browsing.

In one implementation, the data processing system can query a user repository for the timestamp of the last content item that was served to this specific user. The user can be identified in an anonymous fashion represented by a device identifier, for example, in the form of a cookie. The user may be provided with an opportunity to control whether programs or features that may collect personal information, or to control whether and/or how to receive content from the content server that may be more relevant to the user. In one implementation, if the last request from this user is a certain time period (e.g., 30 minutes) ago, the data processing system may determine that the content request qualifies as a request for "first look" content. "First look" content can be content items on the web page that a user sees after taking a break from a browsing session, including content items that a user first-ever sees.

In one implementation, content items in a content repository can have one or more attributes. One attribute can be a first look attribute which may be an indicator selected by a content provider to designate the content item for consideration in retrieving in response to a request for "first look" content, and which may indicate whether the content item should be displayed only after a user takes a break from a browsing session.

If the data processing system determines that the request qualifies as a request for first look content, the data processing system can retrieve from the content repository those content items that have a positive first look attribute (e.g., first look attribute=true) or content items that do not have a negative first look attribute (e.g., first look attribute=false). The content items retrieved may participate in a content item auction (e.g., based on the content provider's bid price for the content item or other criteria). The data processing system may return the winning content item to the web page server or the user device to be displayed with the web page at the user device.

FIG. 1 illustrates an example system 100 of providing information via at least one computer network such as the network 105. The network 105 can include computer networks such as the Internet, local, wide, metro or other area networks, intranets, and other computer networks such as voice or data mobile phone communication networks. The system 100 can also include at least one data processing system 110. The data processing system 110 can include at least one logic device such as a computing device having a processor to communicate via the network 105, for example with at least one web page server 120, at least one user device 125, and at least one content provider 115. The data processing system 110 can include one or more processing circuits, such as the content placement circuit 130 configured to process information and provide content to the web page server 120 or the user device 125, and one or more databases, such as the user database 135 and the content database 140 configured to store information. The data processing system 110 can include at least one server, such as an advertisement server.

The user device 125 can include computing devices such as a computer, laptop, desktop, smart phone, tablet, personal digital assistant, or server device configured to communicate with other devices via the network 105. The user device 125 can execute a software application (e.g., a web browser or other application) to retrieve content from other computing devices over network 105.

The web page server 120 can include a computer having a server configured to host at least one web page. For example, the web page server 120 may be a computer server (e.g., an FTP server, file sharing server, web server, etc.) or a combination of servers (e.g., a data center, a cloud computing platform, etc.). The web page server 120 can provide webpage data or other content (e.g., text documents, PDF files, and other forms of electronic documents) to the user device 125. In one implementation, the user device 125 can access the web page server 120 via the network 105 to request access to a web page of the web page server 120.

In one implementation, the data processing system 110 can receive, via the network 105, a request for content to display with a resource. The request can include user information and resource information. In one implementation, the resource includes a web page. For example, the content placement circuit 130 can be configured to receive a request from the web page server 120 or the user device 125. The web page server 120 may include an operator of a web site, who may have an agreement with the data processing system 110 for the system to provide content items to display on the web pages of the web page server 120. The user device 125 may be a computing device operated by a user (represented by a device identifier), which, when accessing the web page of the web page server 120, can make a request to the data processing system 110 for content to display on the web page, for instance.

The user information that the data processing system 110 received can be represented in an anonymous fashion so that individuals cannot be identified. In some implementations, the user information can include a HTTP (HyperText Transfer Protocol) cookie which contains an anonymized device identifier (e.g., a number) which represents the user of the user device 125. The resource information can include the uniform resource locator (URL) and the web page content of the web page accessed by the user device 125.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

In one implementation, the data processing system 110 can retrieve, from a user repository, a timestamp of a last request for content from a user associated with the user information. For example, the content placement circuit 130 can be configured to retrieve information, such as the timestamp of the last request for content from a user, from the user repository. In some implementations, anonymized user information can be stored in a user repository, such as the user database 135. Each user (represented by an anonymized device identifier) can have a set of data or information. In one implementation, a user's data can include the time that the user made the last request for content. The time that the user made the last request can be represented in the form of a timestamp. A timestamp can be a sequence of characters or encoded information to identify when a certain event occurred, giving date and time of day. The data processing system 110 can search the user database 135 to match a user (represented by an anonymized device identifier) with the anonymized device identifier or cookie in the user information received along with the request for content. If a match is found, the data processing system 110 can retrieve the timestamp information associated with the user.

In one implementation, the data processing system 110 can determine if a difference between the current time and the timestamp reaches a threshold. For example, the content placement circuit 130 can be configured to compare the current time with the timestamp retrieved from the user database 135 and determine if the difference reaches a threshold (e.g., 30 minutes). The threshold can be implementation dependent and can be the result of empirical studies and analysis. In some implementations, the threshold can be limited to 60 minutes or less such that the performance of the content placement achieves the optimal results. When the threshold is reached, it can be determined that the request for content qualifies as a request for first look content.

In some implementations, if no matching user is found in the user database 135 with the anonymized device identifier or cookie in the user information, the data processing system 110 may determine that the threshold is reached. Similarly, if a matching user is found in the user database 135, but the matching user does not have a timestamp of the last request for content, the data processing system 110 may determine that the threshold is reached.

In one implementation, the data processing system 110 can retrieve, from a content repository, a plurality of content items based at least in part on whether the threshold is reached and at least one attribute of the content items. For example, the content placement circuit 130 can be configured to retrieve multiple content items from a content repository, such as the content database 140. In one implementation, the user repository and content repository can be implemented as separate repositories, such as the user database 135 and the content database 140 in FIG. 1. In another implementation, the user repository and content repository can be implemented as a single repository or database.

In some implementations, content items stored in the content repository can be tagged with attributes or constraints. In one implementation, one attribute of the content items can be a first look attribute, which can be an indicator selected by a content provider (e.g., through a content provider account with the data processing system 110) to designate the content item for consideration in the retrieving. A content provider account may be configured to receive a plurality of parameters relating to when and where a content item is to be selected for display (e.g., keywords relating to the resource, geographic location of the user, etc.) and to one or more associated bids (e.g., dollar amounts) the user is willing to pay to have the content item displayed. The first look attribute can be represented in different forms, such as a binary indicator having values of "true" and "false", or a variable having the values of "yes", "no", or "unknown", for instance.

In one implementation, a content item having the first look attribute with a "true" or "yes" value may indicate the content item can be selected as a candidate for display with a resource, when the difference between the current time and the timestamp of the last request for content reaches a threshold (e.g., 30 minutes). A content item having the first look attribute with a "false" or "no" value may indicate the content item may not be selected as a candidate for display with a resource when the threshold is reached.

In one implementation, the content placement circuit 130 can be configured to retrieve content items based on the value of the first look attribute and whether the time difference between the current time and the last request for content from the user (represented by an anonymized device identifier) reaches the threshold value (e.g., 30 minutes). For example, if the difference between the current time and the timestamp of the last request for content reaches the threshold value, the content placement circuit 130 may retrieve content items that have a positive first look attribute. In one implementation, the first look attribute is positive when it has a value of "true" or when it does not have a value of "false". Continuing with this example, if the difference between the current time and the timestamp of the last request for content does not reach the threshold value, the content placement circuit 130 may retrieve content items that have a negative first look attribute. In one implementation, the first look attribute is negative when it has a value of "false".

In one implementation, the data processing system 110 can select at least one content item from the plurality of content items. For example, the content placement circuit 130 can be configured to select one or more content items from the multiple content items retrieved from the content database 140. In some implementations, an auction can be conducted among the multiple content items based on a set of criteria. The criteria to select a content item in the auction may include the cost-per-click bid by the content provider, the click-through rate (CTR) of the content item, the relevancy of the content item to the resource information (e.g., keywords on the web page), etc.

In one implementation, the data processing system 110 can provide the content item for display with the resource, such as a web page. For example, the content placement circuit 130 can be configured to provide the content item to display at the user device 125 via the network 105. In one implementation, the content item can be displayed in a first portion of the web page and the subject matter of the web page can be displayed in a second portion of the web page. In this implementation, different portions of the web page can be dedicated for different content items. For instance, a portion at the left of the web page can be dedicated for the subject matter of the web page, such as a news article, while a portion at the right of the web page can be dedicated for other content items, such as advertisements.

Figure 2:
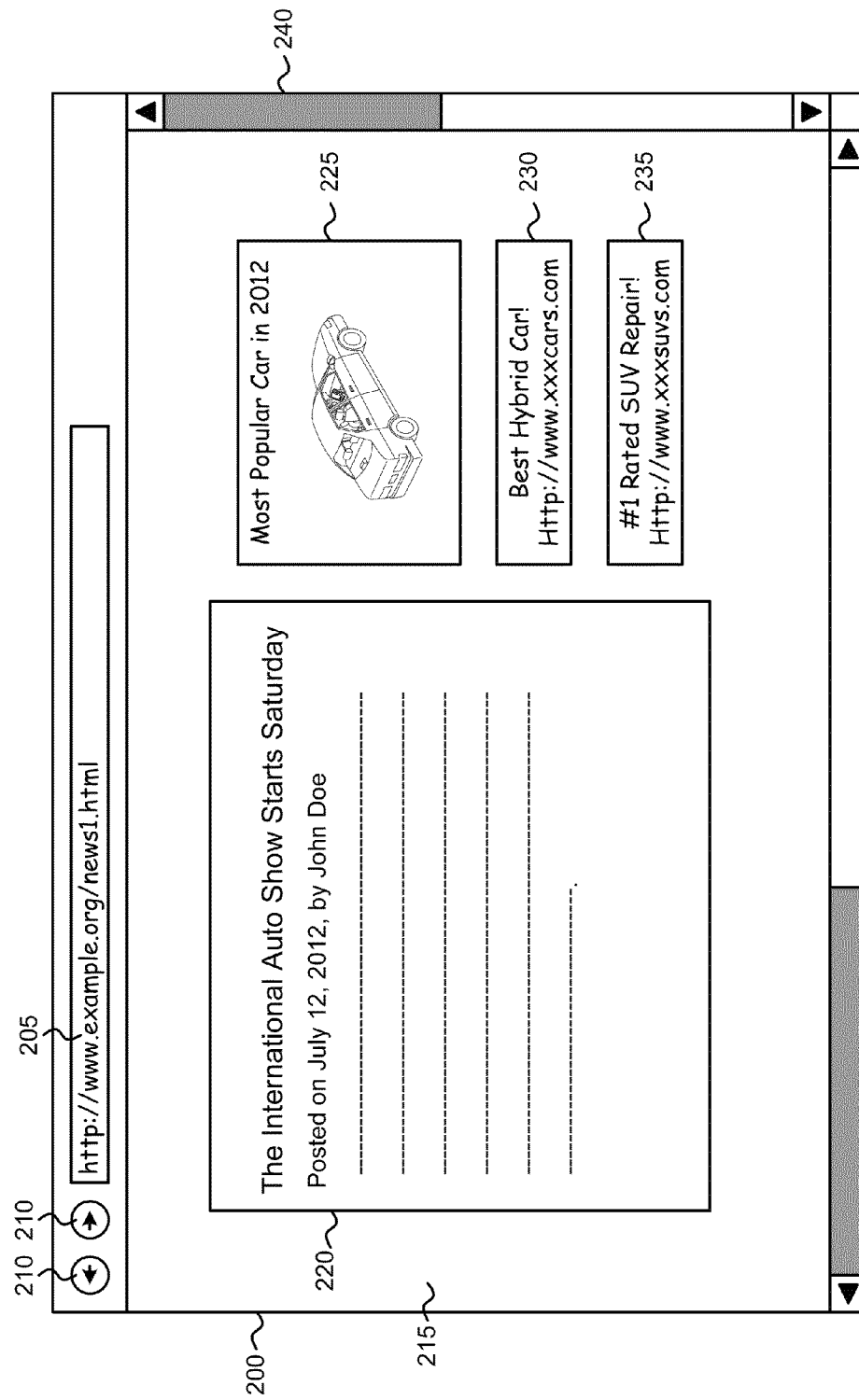
FIG. 2 is an illustration of an example resource having content items, according to an illustrative implementation.

FIG. 2 is an illustration of an example resource having content items, according to an illustrative implementation. In FIG. 2, an example display 200 is shown. Display 200 is in electronic communication with one or more processors that cause visual indicia to be provided on display 200. Display 200 may be located inside or outside of the housing of the one or more processors, such as the user device 125. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application. The web browser application operates by receiving input of a URL into a field 205, such as a web address, from an input device (e.g., a pointing device, a keyboard, a touch screen, or another form of input device). In response, one or more processors executing the web browser may request data from a content source (e.g., the web page server 120) corresponding to the URL via a network 105. The content source may then provide resource data (e.g., webpage data) and/or other data to the client device (e.g., the user device 125), which causes visual indicia to be displayed by display 200.

In general, resource or webpage data may include text, hyperlinks, layout information, and other data that is used to provide the framework for the visual layout of displayed resource or web page 215. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "news1.html" provided by the website, "www.example.org." The webpage data may include data that specifies where indicia appear on web page 215, such as news article 220 or other objects. In some implementations, the webpage data may also include additional URL information used by the client device to retrieve additional indicia displayed on web page 215. For example, the file, "news1.html," may also include one or more advertisement tags used to retrieve content items 225, 230, and 235 from a remote location (e.g., an advertisement server in the data processing system 110, the content source that provides web page 215, etc.) and to display content items 225, 230, and 235 on display 200.

The web browser providing data to display 200 may include a number of navigational controls associated with web page 215. For example, the web browser may include the ability to go back or forward to other web pages using inputs 210 (e.g., a back button, a forward button, etc.). The web browser may also include one or more scroll bars 240, which can be used to display parts of web page 215 that are currently off-screen. For example, web page 215 may be formatted to be larger than the screen of display 200. In such a case, one or more scroll bars 240 may be used to change the vertical and/or horizontal position of web page 215 on display 200.

As shown in FIG. 2, the news article 220, which is the subject matter of the web page 215, is located in a portion of the web page 215. The content items 225, 230, and 235 are located in a different portion of the web page 215. The various functions associated with content items 225, 230, and 235 may be implemented by including one or more advertisement tags within the web page code located in "news1.html" and/or other files. For example, "news1.html" may include an advertisement tag that specifies that a content item slot is to be located at the position of the content item 214. Another advertisement tag may request an advertisement from a remote location, for example, from the content database 140 of the data processing system 110. Such a request may include one or more keywords or other data (e.g., a cookie) used by the data processing system 110 to select a content item to provide to the user device 125.

Referring back to FIG. 1, in one implementation, the data processing system 110 can store the current time as the timestamp of the last request for content associated with the user in the user repository. For example, the content placement circuit 130 can be configured to store the current time as the timestamp of the last request for content associated with the user (represented by an anonymized device identifier) in the user database 135. In some implementations, the data processing system 110 stores the current time as the last request for content after a predetermined time period (e.g., 200 milliseconds) elapses. The waiting of the predetermined time period can help to ensure that multiple content requests that originate from the same web page in parallel are eligible for content items with the positive first look attribute. For example, if a web page has three content items (e.g., content items 225, 230, and 235 in FIG. 2), all three requests for content can qualify as requests for first look content.

In some implementations, the timestamp of the last request for content from the user (represented by an anonymized device identifier) can be associated with the domain name of the uniform resource identifier of the web page. In these implementations, each user in the user repository may have a group of timestamp and website pairs. The website in the timestamp and website pair can be the domain name of the URLs of the web pages. For example, URLs, such as www.example.com/example1.html and www.example.com/example2.html are both represented by their domain name www.example.com in the pair. The timestamp in the timestamp and website pair can indicate the time of the last request for content from the user when the user visited the website. In these implementations, the data processing system 110 may determine the difference between the current time and the timestamp of the last request for content reaches the threshold only when the domain name of the URL in the resource information matches the website in the website and timestamp pair.

In some implementations, the data processing system 110 can also check the lifespan of the HTTP cookie in the user information. If the lifespan of the HTTP cookie is less than a predetermined value (e.g., one day), the data processing system 110 may determine that the threshold is not reached and retrieve content items having a negative first look attribute. This may prevent malicious users who could increase the first look content items displayed on the web pages of a publisher (e.g., the web page server 120) by repeatedly deleting their user cookies and requesting new user cookies.

Figure 3:
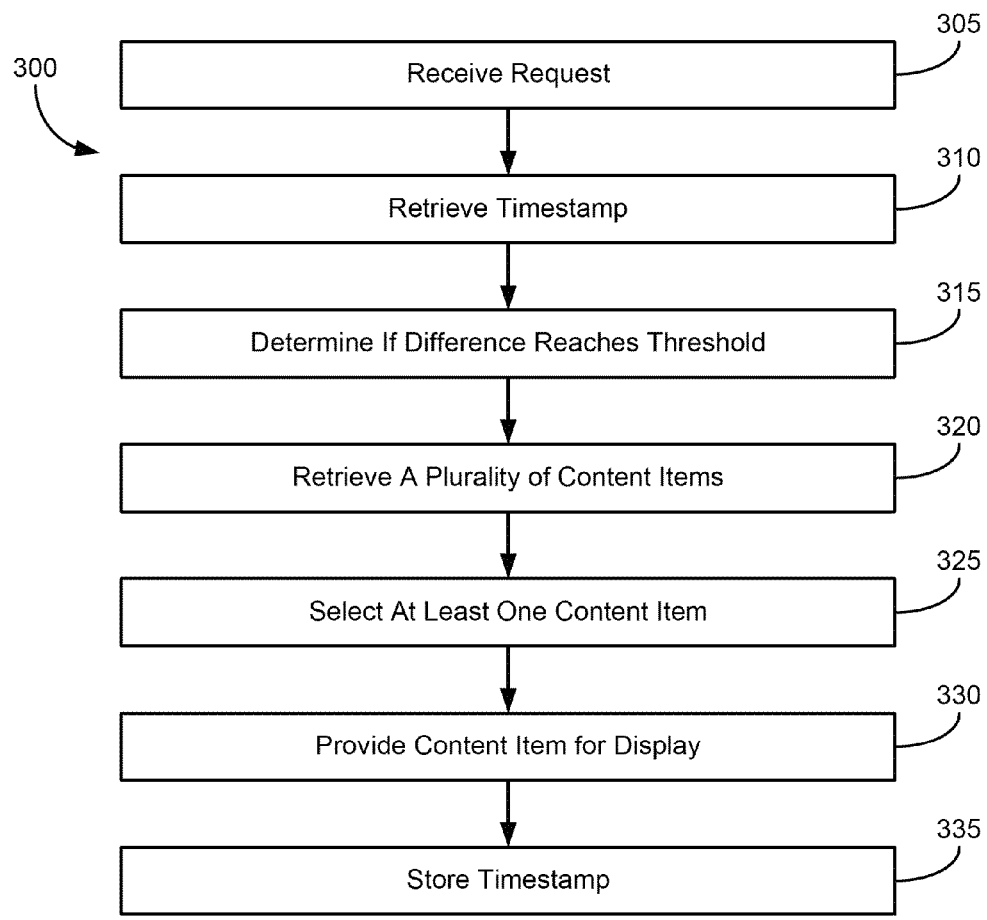
FIG. 3 is a flow diagram depicting a method of providing information via a computer network, according to an illustrative implementation.

FIG. 3 illustrates a flow diagram depicting a method 300 of providing information via a computer network. The method 300 can receive a request for content to display with a resource via a network (BLOCK 305). For example, a data processing system having a content placement circuit can receive a request from a user device or a web page server. The received request can include user information and resource information. In one implementation, the resource includes a web page.

The method 300 can retrieve, from a user repository, a timestamp of a last request for content from a user associated with the user information (BLOCK 310). For example, the content placement circuit can retrieve a timestamp from a user repository. In some implementations, anonymized user information can be stored in a user repository, which may include the timestamp of the last request for content from the user. The data processing system can search the user repository to match a user (represented by an anonymized device identifier) with the anonymized device identifier or cookie in the user information received along with the request for content. If a match is found, the data processing system can retrieve the timestamp (BLOCK 310) information associated with the user.

The method 300 can determine if a difference between the current time and the timestamp reaches a threshold (BLOCK 315). For example, the content placement circuit can compare the current time with the timestamp retrieved from the user repository and determine if the difference reaches a threshold (e.g., 30 minutes). In some implementations, the threshold can be limited to 60 minutes. When the threshold is reached, it can be determined that the request for content qualifies as a request for first look content.

The method 300 can retrieve, from a content repository, a plurality of content items based at least in part on whether the threshold is reached and at least one attribute of the content items (BLOCK 320). For example, the content placement circuit can retrieve multiple content items from a content repository. In some implementations, content items stored in the content repository can be tagged with attributes or constraints, including a first look attribute. The first look attribute can be an indicator selected by a content provider to designate the content item for consideration in the retrieving.

In one implementation, the method 300 can retrieve content items (BLOCK 320) based on the value of the first look attribute and whether the time difference between the current time and the last request for content from the user (represented by an anonymized device identifier) reaches the threshold value (e.g., 30 minutes). For example, if the difference between the current time and timestamp of the last request for content reaches the threshold value, the content placement circuit may retrieve content items (BLOCK 320) that have a positive first look attribute. Continuing with this example, if the difference between the current time and timestamp of the last request for content does not reach the threshold value, the content placement circuit may retrieve content items (BLOCK 320) that have a negative first look attribute.

The method 300 can select at least one content item from the plurality of content items (BLOCK 325). For example, the content placement circuit can select one or more content items from the multiple content items retrieved from the content repository by conducting an auction.

The method 300 can provide the content item for display with the resource, such as a web page (BLOCK 330). For example, the content placement circuit may provide the content item to display via a network. In one implementation, the content item can be displayed in a first portion of the web page and the subject matter of the web page can be displayed in a second portion of the web page.

The method 300 can store the current time as the timestamp of the last request for content associated with the user in the user repository (BLOCK 335). For example, the content placement circuit can store the current time as the timestamp of the last request for content associated with the user (represented by an anonymized device identifier) in the user repository. In some implementations, the content placement circuit can store the current time as the last request for content after a predetermined time period (e.g., 200 milliseconds) elapses.

Figure 4:
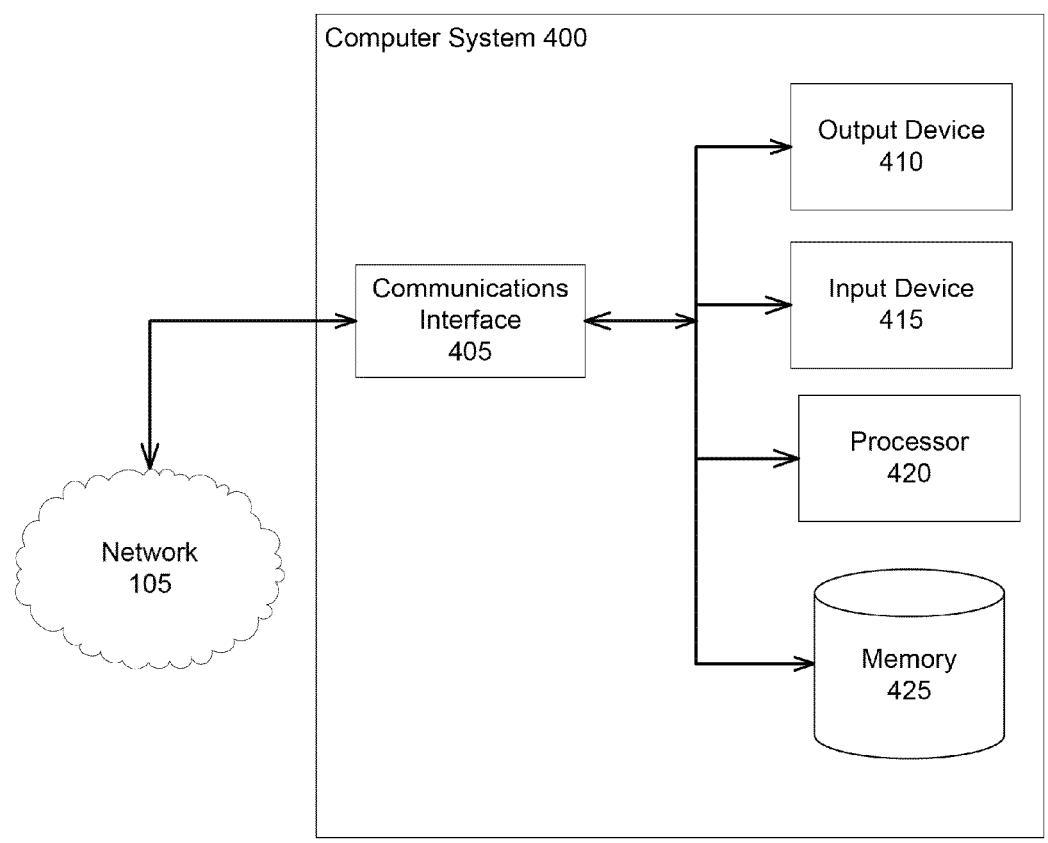
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the content placement circuit 130) in accordance with some embodiments. The computer system 400 can be used to provide information via the network 105. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in data processing system 110 or the other components of the system 100 (such as the content placement circuit 130).

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the content placement circuit 130 can include the memory 425 to store the advertisement identified from the keyword as well as the URL of the second web page. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces (e.g., web pages) having content selected by the content placement circuit 130 and provided by the content provider 115 for placement on the web pages.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing apparatus," "data processing system," or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content placement circuit 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 100 can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the content placement circuit 130 can be a single module, a logic device having one or more processing circuits, or part of a search engine.

Having now described some illustrative implementations and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer-implemented method of providing information via a computer network, comprising:
    storing, in a content repository, a plurality of content items, at least some of the plurality of content items associated with an attribute indicating that the content item may be served only when a time period has exceeded a threshold and others of the plurality of content items lacking that attribute;
    receiving, by a data processing system having a content placement circuit, a first request for content to display with a resource, wherein the first request includes user information and resource information;
    retrieving, from a user repository, a timestamp of a prior request for content from a user associated with the user information;
    determining that the time period since the prior request exceeds the threshold based at least in part on the timestamp;
    retrieving, from the content repository responsive to the determination, the at least some of the plurality of content items;
    selecting a first content item from the at least some of the plurality of content items by conducting a first auction based at least in part on the resource information and the user information;
    providing the first content item for display with the resource;
    receiving, by the data processing system, a second request for content to display with the resource, wherein the second request includes the user information;
    retrieving, from the user repository, the timestamp of the prior request for content from the user associated with the user information;
    determining that the time period since the prior request does not exceed the threshold based at least in part on the timestamp;
    retrieving, from the content repository responsive to the determination, the others of the plurality of content items;
    selecting a second content item from the others of the plurality of content items by conducting a second auction based at least in part on the resource information and the user information; and
    providing the second content item for display with the resource.

2. The method of claim 1, wherein the attribute is selected by a content provider to designate the content item for consideration in the retrieving, the retrieving of the content items further comprising:
    in response to that the time period since the prior request exceeds the threshold, retrieving the content items associated with the attribute; and
    in response to that the time period since the prior request does not exceed the threshold, retrieving the content items lacking the attribute.

3. The method of claim 1, wherein the resource includes a web page and the first content item includes an advertisement, further comprising:
    displaying the advertisement in a first portion of the web page; and
    displaying subject matter of the web page in a second portion of the web page.

4. The method of claim 1, further comprising:
    determining whether the time period since the prior request exceeds the threshold by comparing a current time with the timestamp; and
    storing, in the user repository, the current time as the timestamp of the prior request for content in the user information of the user.

5. The method of claim 4, further comprising:
    storing, in the user repository, the current time as the timestamp of the prior request for content in the user information of the user after a predetermined time period elapses.

6. The method of claim 5,
    wherein the threshold has a value of less than 60 minutes; and
    wherein the predetermined time period is 200 milliseconds.

7. The method of claim 1, wherein the resource includes a web page, wherein the timestamp of the prior request for content from the user is associated with a domain name of a uniform resource identifier of the web page.

8. The method of claim 1, wherein the user information includes a hypertext transfer protocol cookie.

9. The method of claim 8, wherein the attribute is selected by a content provider to designate the content item for consideration in the retrieving, the retrieving of the content items further comprising:
    if a lifespan of the hypertext transfer protocol cookie is less than a predetermined value, retrieving the content items lacking the attribute.

10. A system of providing information via a computer network, comprising:
    a data processing system having at least a content placement circuit, the data processing system configured to:
        store, in a content repository, a plurality of content items, at least some of the plurality of content items associated with an attribute indicating that the content item may be served only when a time period has exceeded a threshold and others of the plurality of content items lacking that attribute;
        receive a first request for content to display with a resource, wherein the first request includes user information and resource information;
        retrieve, from a user repository, a timestamp of a prior request for content from a user associated with the user information;
        determine that the time period since the prior request exceeds the threshold based at least in part on the timestamp;
        retrieve, from the content repository responsive to the determination, the at least some of the plurality of content items;
        select a first content item from the at least some of the plurality of content items by conducting a first auction based at least in part on the resource information and the user information;
        provide the first content item for display with the resource;

receive, by the data processing system, a second request for content to display with the resource, wherein the second request includes the user information;

retrieve, from the user repository, the timestamp of the prior request for content from the user associated with the user information;

determine that the time period since the prior request does not exceed the threshold based at least in part on the timestamp;

retrieve, from the content repository responsive to the determination, the others of the plurality of content items;

select a second content item from the others of the plurality of content items by conducting a second auction based at least in part on the resource information and the user information; and provide the second content item for display with the resource.

11. The system of claim 10, wherein the attribute is selected by a content provider to designate the content item for consideration in the retrieving, further comprising the data processing system configured to:

in response to that the time period since the prior request exceeds the threshold, retrieve the content items associated with the attribute; and in response to that the time period since the prior request does not exceed the threshold, retrieve the content items lacking the attribute.

12. The system of claim 10, wherein the resource includes a web page and the first content item includes an advertisement, further comprising the data processing system configured to:

display the advertisement in a first portion of the web page; and display subject matter of the web page in a second portion of the web page.

13. The system of claim 10, further comprising the data processing system configured to:

determine whether the time period since the prior request exceeds the threshold by comparing a current time with the timestamp; and store, in the user repository, the current time as the timestamp of the prior request for content in the user information of the user.

14. The system of claim 13, further comprising the data processing system configured to:

store, in the user repository, the current time as the timestamp of the prior request for content in the user information of the user after a predetermined time period elapses.

15. The system of claim 14, wherein the threshold has a value of less than 60 minutes, and wherein the predetermined time period is 200 milliseconds.

16. The system of claim 10, wherein the resource includes a web page, wherein the timestamp of the prior request for content from the user is associated with a domain name of a uniform resource identifier of the web page.

17. The system of claim 10, wherein the user information includes a hypertext transfer protocol cookie.

18. The system of claim 17, wherein the attribute is selected by a content provider to designate the content item for consideration in the retrieving, further comprising the data processing system configured to:

retrieve the content items lacking the attribute if a lifespan of the hypertext transfer protocol cookie is less than a predetermined value.

19. A computer readable storage medium having machine instructions stored therein, the instructions being executable by one or more processors to cause the one or more processors to perform operations comprising:

storing, in a content repository, a plurality of content items, at least some of the plurality of content items associated with an attribute indicating that the content item may be served only when a time period has exceeded a threshold and others of the plurality of content items lacking that attribute;

receiving a first request for content to display with a resource, wherein the first request includes user information and resource information;

retrieving, from a user repository, a timestamp of a prior request for content from a user associated with the user information;

determining that the time period since the prior request exceeds the threshold based at least in part on the timestamp;

retrieving, from the content repository responsive to the determination, the at least some of the plurality of content items;

selecting a first content item from the at least some of the plurality of content items by conducting a first auction based at least in part on the resource information and the user information;

providing the first content item for display with the resource;

receiving, by the data processing system, a second request for content to display with the resource, wherein the second request includes the user information;

retrieving, from the user repository, the timestamp of the prior request for content from the user associated with the user information;

determining that the time period since the prior request does not exceed the threshold based at least in part on the timestamp;

retrieving, from the content repository responsive to the determination, the others of the plurality of content items;

selecting a second content item from the others of the plurality of content items by conducting a second auction based at least in part on the resource information and the user information; and providing the second content item for display with the resource.

20. The computer readable storage medium of claim 19, wherein the attribute is selected by a content provider to designate the content item for consideration in the retrieving, the instructions further comprising:

in response to that the time period since the prior request exceeds the threshold, retrieving the content items associated with the attribute; and in response to that the time period since the prior request does not exceed the threshold, retrieving the content items lacking the attribute.

* * * * *